US011522844B2

(12) United States Patent
Yoches et al.

(10) Patent No.: US 11,522,844 B2
(45) Date of Patent: *Dec. 6, 2022

(54) SYSTEM, METHOD AND ARCHITECTURE FOR SECURE SHARING OF CUSTOMER INTELLIGENCE

(71) Applicant: Capital One Services, LLC, McLean, VA (US)

(72) Inventors: Jeremy Yoches, McLean, VA (US); Christopher Vito Covalucci, McLean, VA (US); Scott Johnson, McLean, VA (US)

(73) Assignee: Capital One Services, LLC, McLean, VA (US)

( * ) Notice: Subject to any disclaimer, the term of this patent is extended or adjusted under 35 U.S.C. 154(b) by 355 days.

This patent is subject to a terminal disclaimer.

(21) Appl. No.: 16/291,161

(22) Filed: Mar. 4, 2019

(65) Prior Publication Data

US 2020/0112551 A1 Apr. 9, 2020

Related U.S. Application Data

(63) Continuation of application No. 16/153,808, filed on Oct. 7, 2018, now Pat. No. 10,263,970.

(51) Int. Cl.
*H04L 9/40* (2022.01)
*H04L 9/08* (2006.01)
(Continued)

(52) U.S. Cl.
CPC .......... *H04L 63/067* (2013.01); *G06F 16/903* (2019.01); *G06F 16/9574* (2019.01);
(Continued)

(58) Field of Classification Search
CPC ... H04L 29/06; H04L 9/06; H04L 9/08; H04L 9/32; H04L 63/067; H04L 9/083;
(Continued)

(56) References Cited

U.S. PATENT DOCUMENTS 7,353,532 B2 4/2008 Duri et al.
8,082,332 B2 12/2011 Gilbert
(Continued)

FOREIGN PATENT DOCUMENTS

EP 0456386 A2 11/1991
WO 9642041 A2 12/1996
WO 2017104701 A1 6/2017

OTHER PUBLICATIONS

International Search Report and Written Opinion of International Patent Application No. PCT/US2019/054509 dated Jan. 8, 2020, 14 pages.

*Primary Examiner* — Jayesh M Jhaveri
(74) *Attorney, Agent, or Firm* — KDB

(57) ABSTRACT

A key master service capable of operating on a service provider in a network enables is disclosed. The key master enables authorized parties to securely exchange client information without compromising client security. One feature of the key master service is the generation of a unique key for each client. All parties in an authorized universe access, exchange and modify client information by referencing the universal key, rather than using known client identifiers. Client information is further secured by advantageously applying an obfuscation function to the data. Obfuscated client information is stored together with the universal key as keyed client data at the client and/or server, where it may be directly accessed by the service provider or third parties. Because client information is stored and exchanged without the ability to discern either the client identity or the nature of the information, such information is secured against malicious third-party interception.

17 Claims, 8 Drawing Sheets

(51) Int. Cl.
*H04L 9/32* (2006.01)
*H04L 9/06* (2006.01)
*G06F 16/903* (2019.01)
*G06F 16/957* (2019.01)

(52) U.S. Cl.
CPC ............ *H04L 9/083* (2013.01); *H04L 9/0866* (2013.01); *H04L 9/0891* (2013.01); *H04L 9/3228* (2013.01); *H04L 9/0643* (2013.01)

(58) Field of Classification Search
CPC ... H04L 9/0866; H04L 9/0891; H04L 9/3228; H04L 9/0643; H04L 9/40; G06F 16/903; G06F 16/957; G06F 16/9574
See application file for complete search history.

(56) References Cited

U.S. PATENT DOCUMENTS

| | | | |
|---|---|---|---|
| 9,104,778 | B2 | 8/2015 | Casteel et al. |
| 9,659,307 | B2 | 5/2017 | Casteel et al. |
| 9,769,159 | B2 | 9/2017 | Bikkula et al. |
| 10,277,659 | B1 * | 4/2019 | Kapczynski ............ H04L 67/02 |
| 2002/0152378 | A1 | 10/2002 | Wallace, Jr. et al. |
| 2002/0169961 | A1 * | 11/2002 | Giles .................... G06F 21/6218 713/175 |
| 2002/0178370 | A1 * | 11/2002 | Gurevich ............... G06F 21/606 713/189 |
| 2004/0049673 | A1 | 3/2004 | Song et al. |
| 2004/0117486 | A1 | 6/2004 | Bourne et al. |
| 2005/0010764 | A1 * | 1/2005 | Collet ................... H04L 9/0819 713/165 |
| 2007/0204031 | A1 | 8/2007 | Alstad et al. |
| 2008/0123861 | A1 * | 5/2008 | Chow ................. H04L 63/0428 380/279 |
| 2009/0259735 | A1 * | 10/2009 | Gilbert .................... H04L 67/02 715/745 |
| 2010/0017616 | A1 * | 1/2010 | Nichols ............... H04L 63/0428 713/183 |
| 2012/0023570 | A1 * | 1/2012 | Gorodyansky ..... H04L 63/0407 726/12 |
| 2014/0142979 | A1 * | 5/2014 | Mitsunaga ............. G16H 10/60 705/3 |
| 2017/0169100 | A1 * | 6/2017 | Reshadi ................. G06F 21/64 |
| 2018/0343113 | A1 * | 11/2018 | Udassin ................... H04L 9/14 |
| 2019/0286498 | A1 * | 9/2019 | Sato ........................ H04L 67/02 |
| 2020/0028926 | A1 * | 1/2020 | Sprague ................ H04L 9/0897 |

\* cited by examiner

| | | | | | | | |
|---|---|---|---|---|---|---|---|
| Elements | Console | Sources | Network | Performance | Memory | Application | Security | Alerts |

Application
Manifest
Service Workers
Clear Storage

| Name | Value | Domain | Path | Expires/Max-Age |
|---|---|---|---|---|
| AMCVS_317906C3... | 1 | .SP.com | / | 1969-12-31T23:59:59.000Z |
| AMCVS_317906C5... | 1099438348%7CMCIDTS%... | .SP.com | / | 2020-02-01T17:00:36.000Z |
| C1_AMT | AQIC5wM2LY4SfcwFPaT.. | .SP.com | / | 2018-12-01T23:59:59.000Z |
| C1_CCID | AQIC5wM2LY4SfcwFPaT.. | .SP.com | / | 2018-12-01T23:59:59.000Z |
| C1_PRID | AQIC5wM2LY4SfcwFPaT.. | .SP.com | / | 2018-12-01T23:59:59.000Z |
| C1_KEY | d982139b-a13e-469f-819a-i7.. —706 | .SP.com | / | 9999-12-31T23:59:59.000Z |

Storage
Local Storage
Session Storage
Indexed DB
Web SQL
Cookies
  https://Spservices.demdex.net
  https://d1af033869koo7.cloudfront.net

SYSTEM, METHOD AND ARCHITECTURE FOR SECURE SHARING OF CUSTOMER INTELLIGENCE

RELATED APPLICATIONS

This application is a Continuation of U.S. patent application Ser. No. 16/153,808, entitled "SYSTEM, METHOD AND ARCHITECTURE FOR SECURE SHARING OF CUSTOMER INTELLIGENCE" filed on Oct. 7, 2018. The contents of the aforementioned application is incorporated herein by reference.

BACKGROUND

Many service providers use "cookies" to personalize a client's website experience. A cookie is a small file that stores client information. This information may include personal information, such as the client's address and password, and behavioral information, such as a client's browsing history.

There are two types of cookies; "session" cookies which are deleted at the end of each web browsing session and "persistent" cookies, which are saved between sessions. During a client's initial access of a service provider website, the service provider populates and downloads the cookie file to the client's browser. If the cookie is a persistent cookie, on subsequent visits by the client to the service provider website the cookie is retrieved, and data related to the client can be extracted to increase efficiencies and personalize the client's website experience.

In addition to improving processing efficiencies, cookies can further be used to tailor advertising and to analyze marketing campaigns by storing client intelligence. Client intelligence may include, for example, a client's browsing history, purchase history and other internet behavior. In some cases, service providers make the client intelligence available to authorized third parties, who may also store cookies at the client.

Although there are significant benefits from the use of cookies, the fact that cookies store personal client information makes them vulnerable to malicious interception. Clients can protect the distribution of their information by restricting a service provider's ability to use persistent cookies. Browsers generally provide the user the ability to control the creation and storage of cookies by service providers and third parties, and users may block the creation of cookies altogether. However, blocking all cookies would ultimately serve only to frustrate the client and to remove the business advantages associated with client intelligence.

It would be desirable to leverage the efficiencies gained through the use of cookies while protecting against inadvertent or unauthorized disclosure of client information.

SUMMARY

According to one aspect of the invention, a method of securing client-related data by a service provider includes the steps of receiving a request from a client for content provided by the service provider and obtaining a key for the client. The method further includes the steps of collecting client-related data and transforming a portion of the client-related data to produce obfuscated client-related data. Keyed client data comprising the key and the obfuscated client-related data is generated and stored. The keyed client data is retrieved and returned in response to third-party requests seeking access to client data. With such an arrangement, client data is protected against malicious interception because only keyed, obfuscated data is made available in communications between the server, client and third-parties.

According to another aspect of the invention, a system to secure client-related data collected by a service provider website includes a key master for transforming a client identifier into a key, a first storage unit for storing the key, a transform unit for transforming at least a portion of client-related data to produce obfuscated client-related data, and secure cookie builder for combining the key and the obfuscated client-related data into keyed client data. A second storage device stores the keyed client data and is accessed by an interface which returns keyed client data in response to third-party requests for the respective client-related data, thereby protecting the client-related data against unauthorized exposure.

According to a further aspect of the invention, a method of securing client-associated data collected by a service provider includes forwarding a request for content to a service provider's website, the request for content including an identifier of a client issuing the request. Responsive to the request keyed client data is received from the service provider where the keyed client data includes a key associated with the identifier and obfuscated data of the client. The keyed client data is stored and forwarded to a third-party in response to a third-party request for client-associated data, where the third-party request comprises the key. With such an arrangement authorized third parties can directly access client cookie information using the key rather than information directly identifying the client. Returned data is unintelligible to unauthorized parties, and the communication of client intelligence is thereby secured.

BRIEF DESCRIPTION OF THE DRAWINGS

FIG. 7 is an example of a browser interface illustrating the storage of a key by a client practicing the present invention;

DETAILED DESCRIPTION

According to one aspect of the invention, a key master service operating on a service provider in a network enables authorized parties to securely exchange client information without compromising client security. One feature of the key master service is the generation of a unique key for each client. All parties in an authorized universe access, exchange and modify client information by referencing the universal key, rather than using known client identifiers. Client information is further secured by advantageously applying an obfuscation function to the data. Obfuscated client information is stored together with the universal key as keyed client data at the client and/or server, where it may be directly accessed by the service provider or third parties. Because client information is stored and exchanged without the ability to discern either the client identity or the nature of the information, such information is secured against malicious third-party interception.

Figure 1:
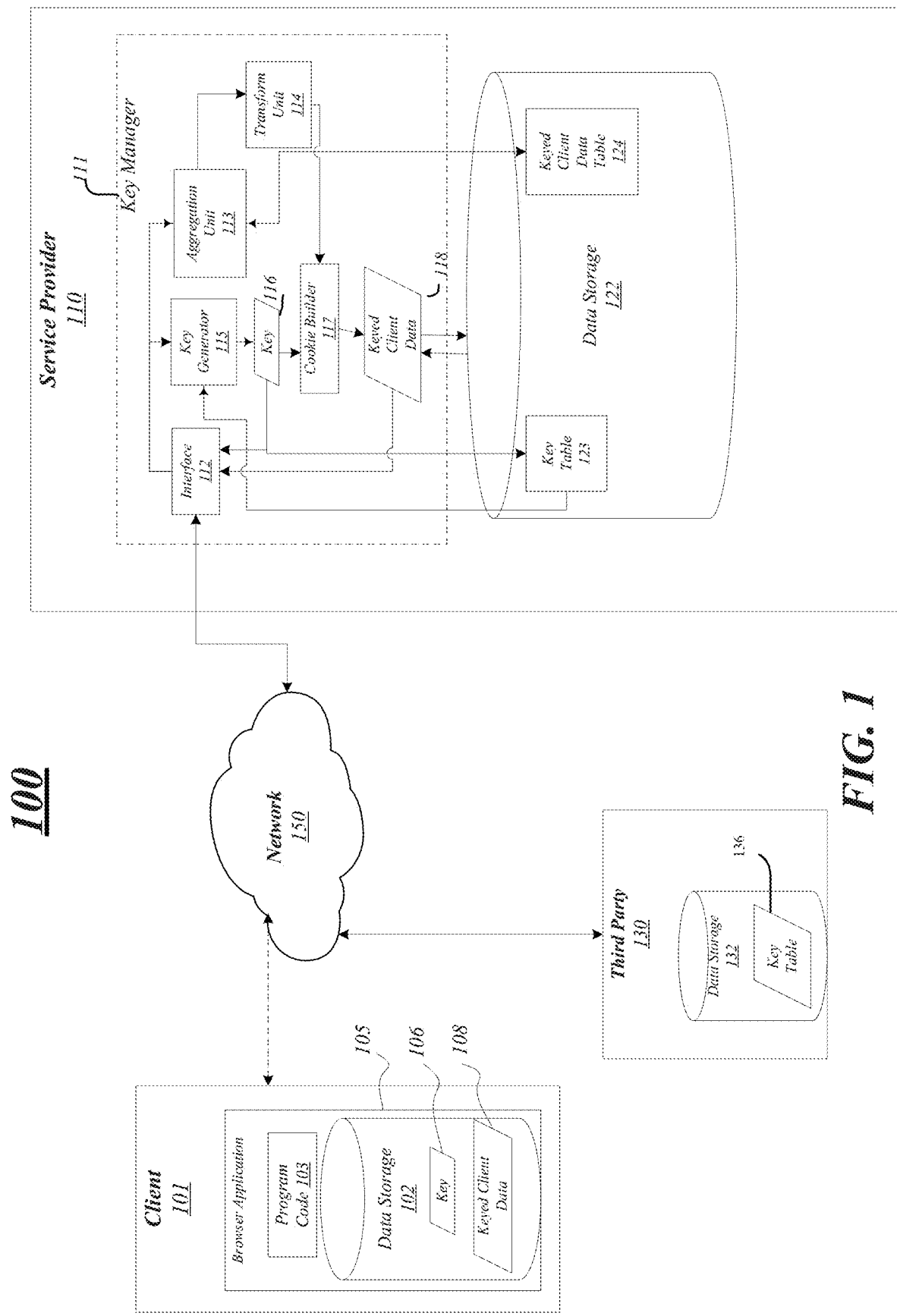
FIG. 1 illustrates components of an exemplary client/server network comprising a key manager according to the present invention.

FIG. 1 illustrates an exemplary networked system 100 in which the present invention may be practiced to secure client information. A network 150 couples one or more end points, such as client 101, service provider 110 and third-party 130. In one embodiment, the service provider 110 may provide both account content (i.e., content that is personal to the client accounts maintained at the service provider) and service content (i.e., consumer-oriented services that are made accessible to the client via a service provider website). The list of consumer-oriented services that are available via the network is exhaustive, but by way of example includes account management services, commercial sales services, advertising services, news services, financial services, communication services, travel services and the like. Service providers make their services available to clients over their network via website interfaces constructed of linked HTML (or other formats) webpages.

Client 101 accesses the website of the service provider by running an internet browser application 105. The browser 105 is a software application such as Google® Chrome®, Internet Explorer®, Safari®, etc. The internet browser 105 includes programming code 103 for translating HTML web pages of the service provider website 110 for display on a graphic user interface (GUI) of the browser 105. Browser 105 is shown to include a local data storage 102 which stores information for use by the browser, including client information usable to improve the efficiency of client/service provider communications. This information could include information that has previously been directly input by the client such as a password or an address. This information could also include information that was indirectly captured for the client such as information regarding web site browsing history and purchase history.

According to one aspect of the invention, the local storage device 102 advantageously stores a key 106 and keyed client data 108. As will be described in more detail below, the key uniquely identifies the client 101 to the service provider 110 and is made available to a universe of authorized third parties as a universal key to be used when collect and modifying client-related information. The keyed client data 108 comprises the key and data that is related to the client but is uninterpretable if obtained through unauthorized means. The stored keyed client data 108 may be retrieved and updated by the service provider during each client session. The keyed client data 108 may also be advantageously pushed to authorized third party services that can benefit from access to such client information.

Service provider 110 of FIG. 1 comprises an interface 112 for communicating over the network 150 to various clients, third-parties and data storage repositories using known network protocols. Interface 112 is coupled to the key master service 111. Key master service 111 is shown to include a key generator 115 and an aggregation unit 113. As will be described later herein, the aggregation unit 113 combines data relating to the client and collected from various sources into a client-related data structure. In one embodiment, the client-related data structure comprises a string of client attributes, which together encompass client intelligence. It is appreciated that data may be represented and stored in many forms and the present invention is not limited to any particular data structure for storage of client intelligence.

Key generator 115 selectively generates keys, such as key 116, for each registered client that accesses the service provider website. The key uniquely identifies the client to the service provider and is used as a universal key in place of a client identifier when broadcasting client intelligence among members of an authorized universe. With such an arrangement, the identity of a client associated with particular client intelligence is masked from unauthorized disclosure.

Following generation, the key 116 is forwarded to key table 123 for storage and to client 101. Key 116 is also forwarded to cookie builder 117, where it is combined with transformed client-related data, received from the aggregation unit 113 via the transform unit 114. Keyed client data is advantageously stored in keyed client data table 124, where they may be retrieved and broadcast over the network without compromising client's identity or other personal, sensitive information.

Also shown coupled to network 150 in FIG. 1 is third party 130. According to one aspect of the invention, certain third parties that may benefit from access to client intelligence may be authorized by the service provider 110 for such access. When authorized, the third party may receive keys and data associated with clients. In some embodiments, an authorized third party may receive key mapping information such as that stored in key table 123 of the service provider, and or translation information (for decoding the client intelligence) to enable the third party to manage its use of client intelligence. In other embodiments, authorized third parties are merely provided translation information for the client intelligence, and the client identifier mapping is not exposed to any party other than the service provider.

Figure 2:
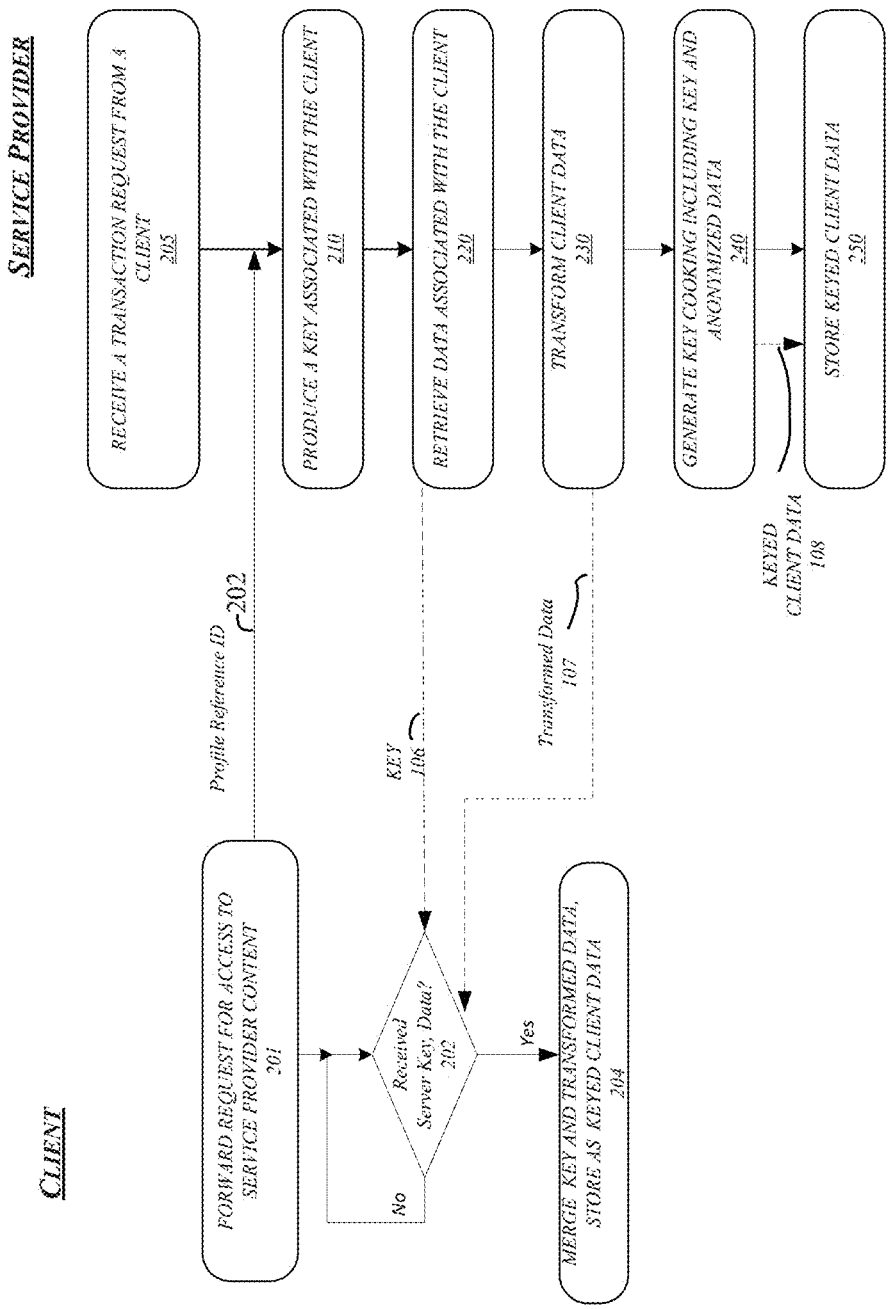
FIG. 2 is a data flow diagram provided to illustrate exemplary steps that may be performed and exemplary data that may be exchanged by a client and server of the network of FIG. 1.

FIG. 2 is a data flow diagram provided to illustrate exemplary steps that may be performed in a communication between a client and service provider operating according the present invention. At step 201 when client 101 accesses a website of service provider 110 the browser initiates a session with the server hosting the service provider website, forwarding a client identifier, such as profile reference identifier 202 to the service provider. For example, the profile reference identifier may be a client identifier that was obtained by the client as part of a preregistration process at the service provider website. At step 205 the service provider receives the profile reference identifier 202, and at step 210 the service provider produces a key 106 for the client 101.

Figure 3:
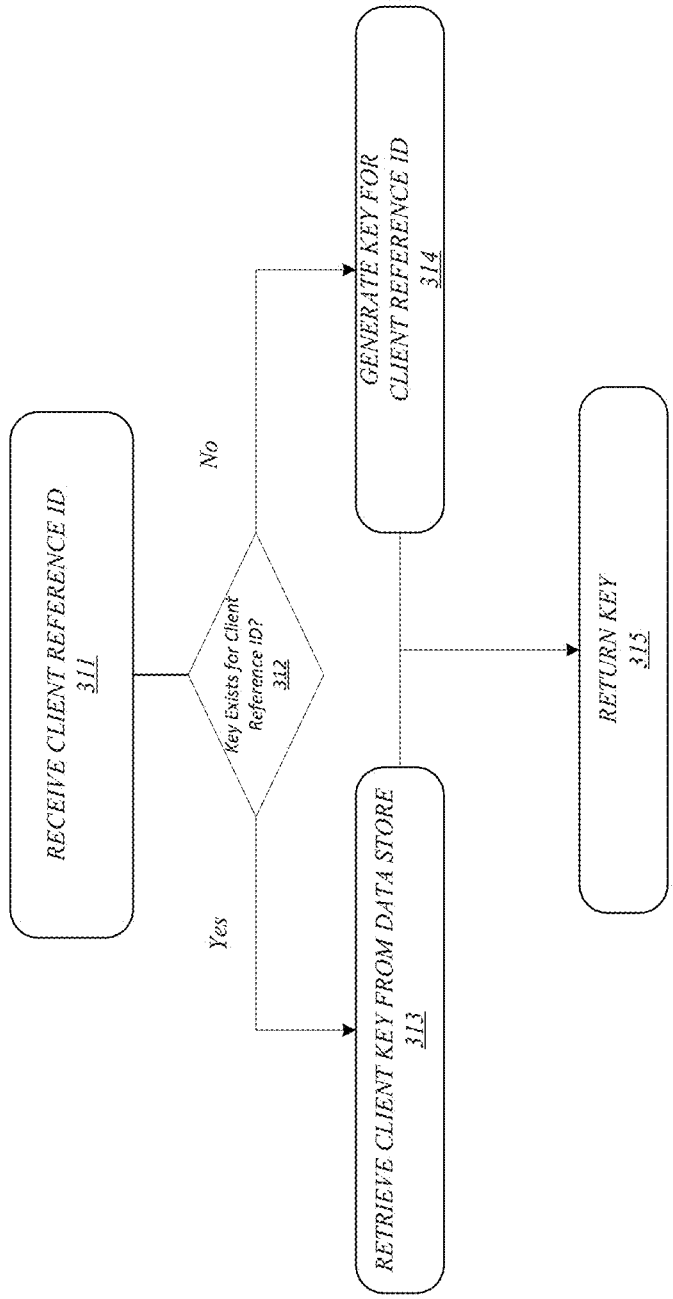
FIG. 3 is a flow diagram illustrating one embodiment of a process performed by the key manager of FIG. 1 to obtain a client key.

FIG. 3 illustrates exemplary steps that may be performed as part of process 210 for producing the key. At step 311 a client reference ID is received as part of a client request, and at step 312 it is compared it to a key table of client reference ID/key mappings to determine if a key exists for the client. If a key exists, at step 313 the client key is retrieved from the key table 123 and returned at step 315 for use by the service provider. If it is determined at step 312 that no key has previously been generated for the client 101, then the service provider generates a key, and at step 315 it is returned for use by the service provider.

As discussed above, the key is a unique value that maps to a client and is shared with third parties only following authentication. The key may be generated using a random number generator, a hash function or other known technique to provide a unique, deidentified key to be used for communication client intelligence between endpoints in a network.

Figure 4:
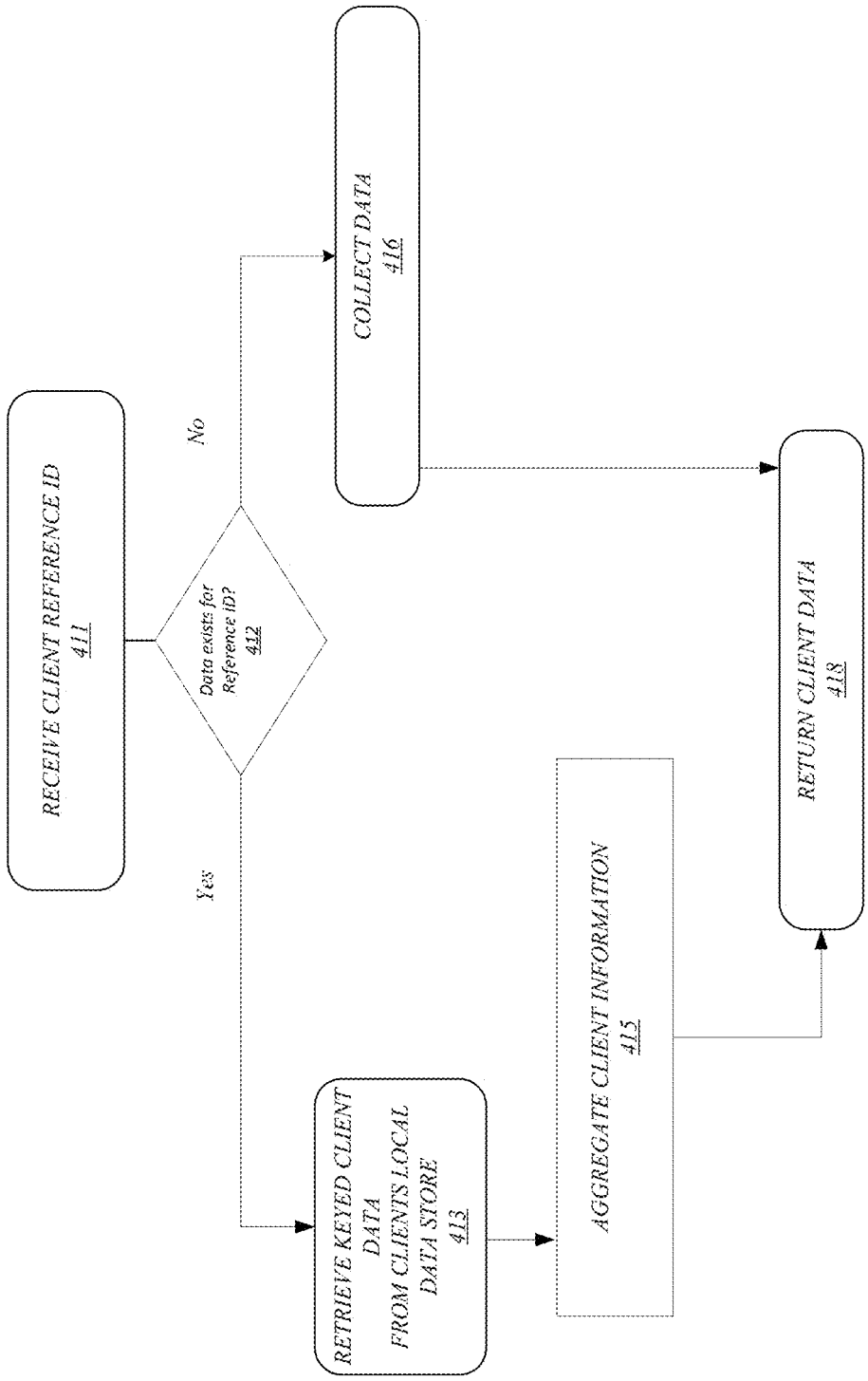
FIG. 4 is a flow diagram illustrating one embodiment of a process performed by the key manager of FIG. 1 to collect client data.

Referring back to FIG. 2, at step 220 the service provider begins the process 220 of retrieving data associated with the client. Although this step is shown to occur sequentially with step 210, it is appreciated that data collection can be initiated upon receipt of the profile reference ID. FIG. 4 illustrates steps that may be performed in a client information collection process. At step 416, if no data has previously been collected for the client, the service provider collects information about the client from one or more existing databases throughout the service providers enterprise using the personal reference ID of the client access.

If it is determined that the client has previously visited the website, according to one aspect of the invention keyed client data has previously been stored for the client. The keyed client data includes client information which has been transformed in such a manner to make it uninterpretable by unauthorized users. At step 412, if it is determined that data has previously been stored, the service provider retrieves the keyed client data 108 from browser local storage 132 and at step 415 advantageously aggregates the keyed client data with other client information collected by the service provider. This 'other client data' may be client data that was retrieved from the service provider through interrogation of other services which the service provider has access to, or from third party services. At step 418, the aggregated client data is returned to the service provider.

Returning to FIG. 2, at step 230 the retrieved client data is transformed to obfuscate the data and protect against unwarranted disclosure. Data may be transformed using any variety of known obfuscation techniques, including but not limited to applying a hash function or other manipulation to the data. Transforming client data in this manner protects the data against inadvertent or malicious disclosure, as transformed client data is uninterpretable by any party not having access or knowledge of the method used to manipulate the client information. The transformed data 107 is returned to the user's browser, where it is merged with Key 106 and stored as the Keyed client data 108 in local browser storage at step 204.

Figure 5:
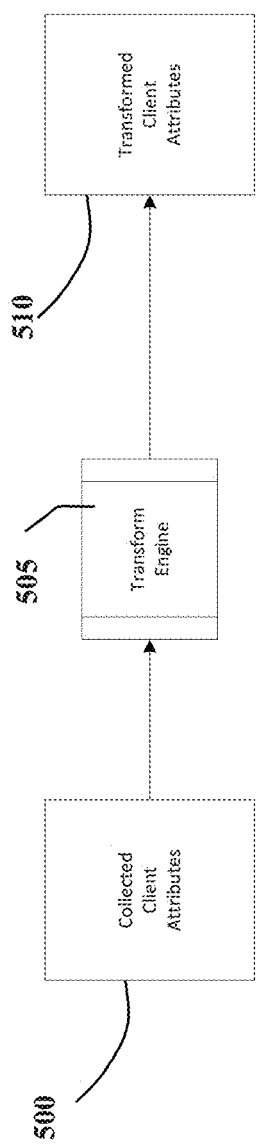
FIG. 5 is a block diagram provided to illustrate the transformation of client information by the key manager of FIG. 1.

FIG. 5 is a high-level block diagram of such transformation process. Collected client attribute data 502 is forwarded to a transform engine 505. The transform engine 505 advantageously applies a transform function to the client attribute data and stores the results as transformed client attribute data 510.

Returning to FIG. 2, at step 240, the transformed client data retrieved from step 230 is combined with the key of step 210 to generate the keyed client data for the client. As discussed above, this keyed client data advantageously stored both by the client browser and at the service provider data store.

Figure 6:
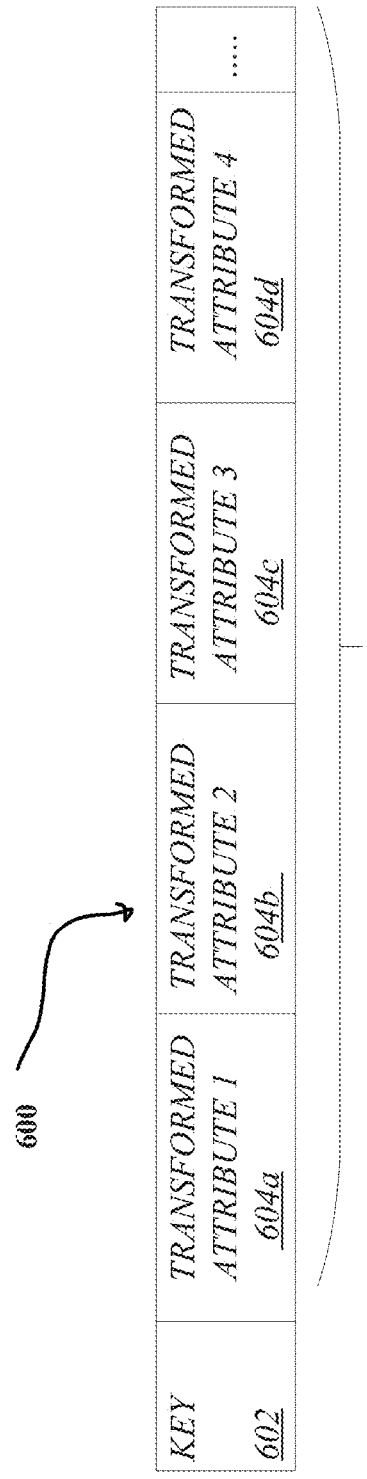
FIG. 6 is a diagram of an exemplary key cookie which may be generated by the key manager of FIG. 1.

FIG. 6 is a block diagram illustrating an exemplary embodiment of keyed client data 600 of the present invention. The keyed client data includes a key 602, and one or more client attributes 604 (listed as 604a-604d), wherein the client attributes have been transformed to be uninterpretable to unauthorized recipients of the keyed client data. The use of the keyed client data enables communication of client intelligence between trusted parties using a universal key, rather than personal client identifiers, to track the data. As a result, client intelligence may be used to improve service efficiencies and increase marketing effectiveness and without sacrificing client security.

FIG. 7 is a diagram of a web browser Graphical User Interface (GUI) illustrating the storage of a key of the present invention by a client's browser. Window 700 illustrates a browser window wherein element 702 is shown highlighted to represent that a user has selected a field in the GUI which results in the display of all cookies in the service provider (SP) domain. In FIG. 7, cookie 706 identifies the key that is to be used universally by authorized third parties for secure exchange of client intelligence according to the present invention.

Figure 8:
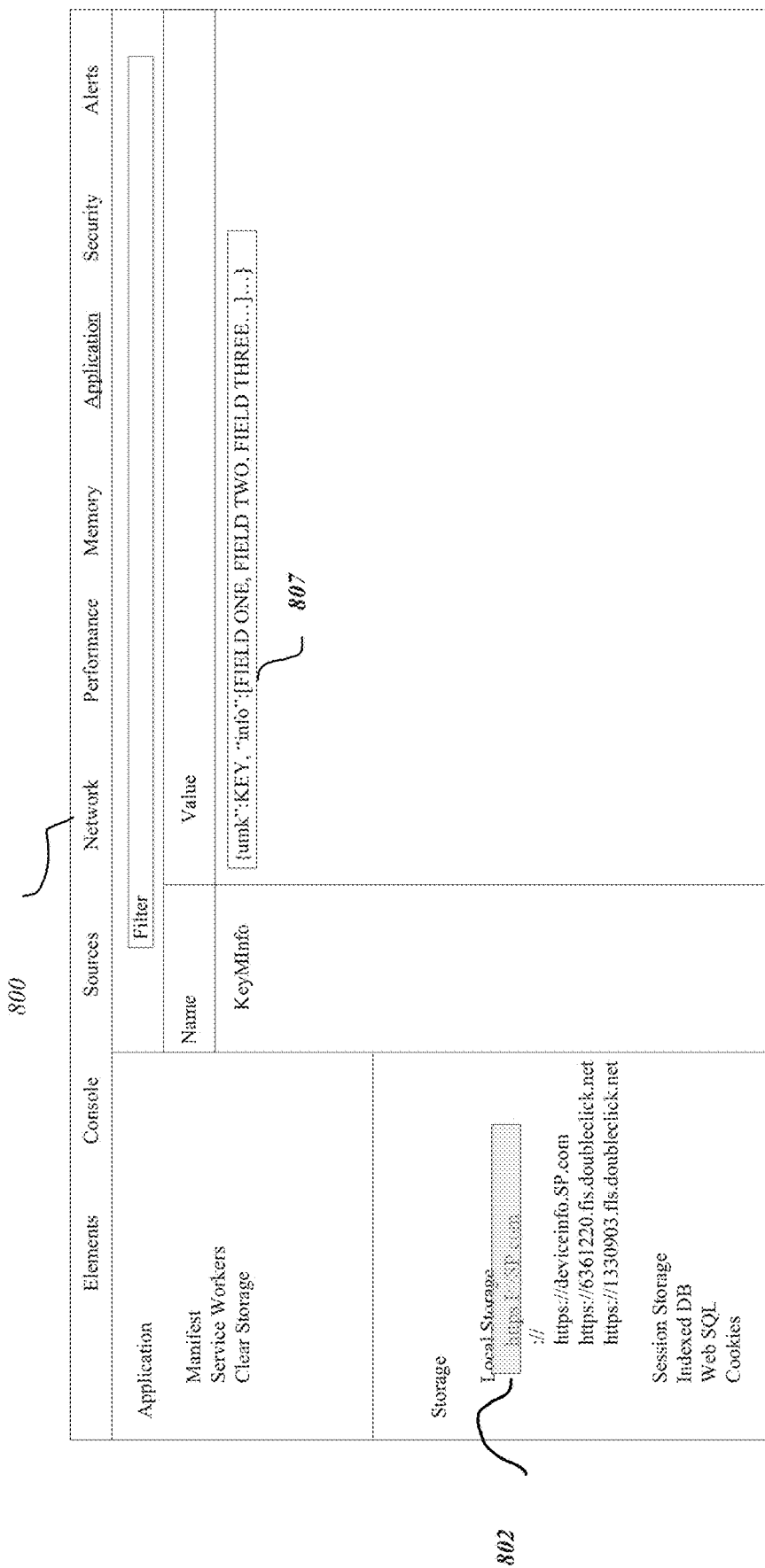
FIG. 8 is an example of a browser interface illustrating the storage of keyed client data by a client, server or third party practicing the present invention.

FIG. 8 is a diagram of the web browser GUI 800 with an item in the "local storage" section shown selected to display a list of data stored by the browser for use by the service provider. In this example, the local storage is shown to store the keyed client data 807, including the key and a number of data fields which include information that is related to the user, but uninterpretable by unauthorized users. In one embodiment the transformed data is further uninterpretable by the client browser software.

Figure 9:
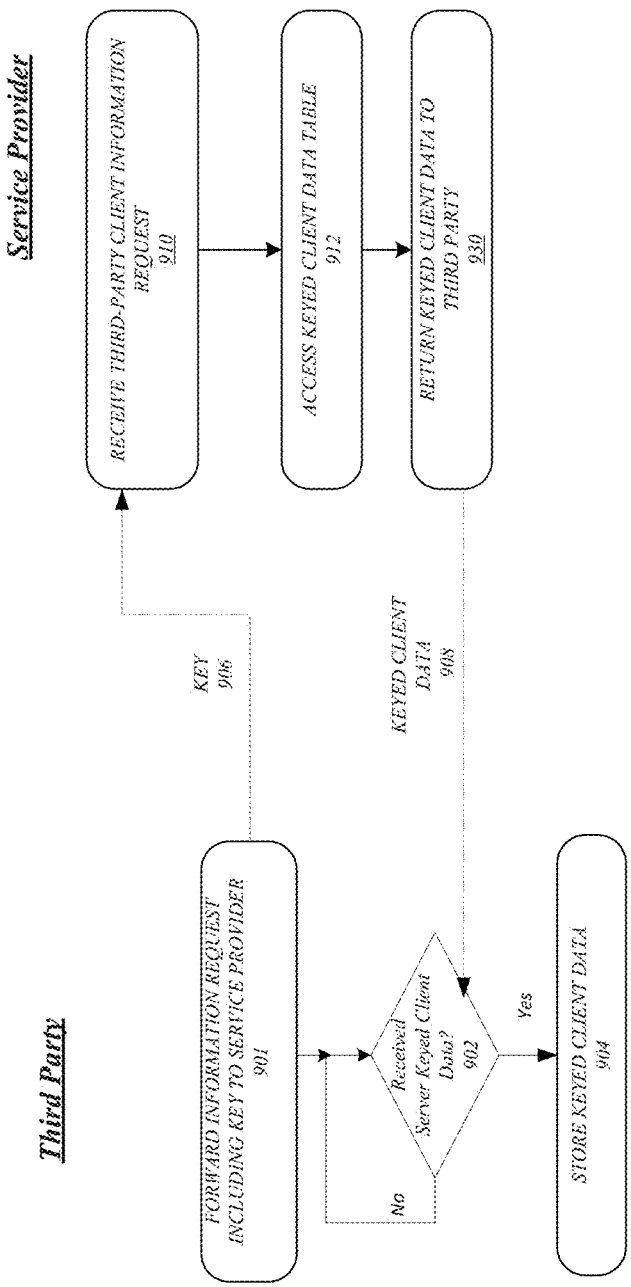
FIG. 9 is a flow diagram illustrating exemplary steps of a methods performed by servers and third parties to securely communicate client information according to the present invention.

FIG. 9 is a flow diagram illustrating the use of the universal key for secure client intelligence gathering by third parties. At step 901 an authorized third party forwards an information request to the service provider, the information request including a key 906 associated with a client whose information is sought by the third party, the key having been provided to the third party as part of a secure exchange authorizing the third party to access information of the respective client.

At step 912, the service provider accesses the keyed client data table, and at step 930 the keyed client data associated with the received key is returned to the third party. In one embodiment, the authorized third party has previously been provided decoding mechanisms to allow decoding and use of the client information. In examining the exchange of communications FIG. 9 it is evident that, even though sensitive customer information is being exchanged between authorized parties, any inadvertent or malicious capture of the information would not compromise sensitive client information.

Accordingly, a system and method have been shown and described which use keyed client data including only obfuscated data to communicate client intelligence between a service provider, client and authorized third parties. With such an arrangement, the benefits of cookies can be leveraged by service providers without compromise to client security.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Moreover, unless otherwise noted the features described above are recognized to be usable together in any combination. Thus, any features discussed separately may be employed in combination with each other unless it is noted that the features are incompatible with each other.

With general reference to notations and nomenclature used herein, the detailed descriptions herein which refer to 'functions', 'engines', 'units', 'blocks' or similar terms may be presented in terms of program procedures executed on a computer or network of computers. These procedural descriptions and representations are used by those skilled in the art to most effectively convey the substance of their work to others skilled in the art.

A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, the manipulations performed are often referred to in terms, such as adding or comparing, which are commonly associated with mental operations performed by a human operator. No such capability of a human operator is necessary, or desirable in most cases, in any of the operations described herein, which form part of one or more embodiments. Rather, the operations are machine operations. Useful machines for performing operations of various embodiments include general purpose digital computers or similar devices.

Some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but still co-operate or interact with each other.

Various embodiments also relate to apparatus or systems for performing these operations. This apparatus may be specially constructed for the required purpose or it may comprise a general-purpose computer as selectively activated or reconfigured by a computer program stored in the computer. The procedures presented herein are not inherently related to a particular computer or other apparatus. Various general-purpose machines may be used with programs written in accordance with the teachings herein, or it may prove convenient to construct more specialized apparatus to perform the required method steps. The required structure for a variety of these machines will appear from the description given.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, various features are grouped together in a single embodiment to streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

What is claimed is:

1. A method for securing client data generated as part of a client-server relationship, comprising:
    forwarding, by a web browser, a web request to a website of a service provider, the web request including a client identifier of a client;
    receiving, in response to the web request, a key from the service provider, the key to uniquely identify the client and known to members of an authorized network and used by the members of the authorized network to identify the client;
    generating a cookie to store in the web browser, the cookie comprising the key;
    storing the cookie in storage allocated to the web browser;
    receiving, from the service provider, obfuscated client intelligence data, wherein the obfuscated client intelligence data comprises information related to an internet activity of the client, and wherein the obfuscated client intelligence data is encoded, the members of the authorized network, using the key, access the obfuscated client intelligence data;
    generating a data structure with the cookie and the obfuscated client intelligence data, the data structure comprising the key, a first identifier to identify the key, the obfuscated client intelligence data in one or more fields, and a second identifier to identify the obfuscated client intelligence data, wherein each field of the one or more fields comprises an attribute associated with the client; and
    storing the data structure in the storage allocated to the web browser, the data structure associated with the website in the web browser, wherein the obfuscated client intelligence data is periodically updated, by the service provider, in response to the internet activity of the client, wherein the members of the authorized network, using the key, access the updated obfuscated client intelligence data.

2. The method of claim 1 wherein the obfuscated client intelligence data comprises a purchase history of the client.

3. The method of claim 1 wherein the obfuscated client intelligence data comprises a browsing history of the client.

4. The method of claim 1, wherein the obfuscated client intelligence data is periodically updated by the service provider to capture the client internet activity at the website of the service provider and at third-party websites.

5. The method of claim 1 periodically transmitting the obfuscated client intelligence data to the service provider.

6. A client device for securing client data generated as part of a client-server relationship, comprising:
    at least one processor;
    at least one non-transitory storage media storing instructions that, when executed by the at least one processor, cause the at least one processor to perform operations including:

forward, by a web browser, a web request to a website of a service provider, the web request including a client identifier of a client;

receive, in response to the web request, a key from the service provider, and store the key in a location allocated to a cookie of the web browser, the key to uniquely identify the client associated with the client device and known to members of an authorized network and used by the members of the authorized network to identify the client;

generate the cookie to store in the web browser, the cookie comprising the key;

store the cookie in a storage allocated to the web browser;

receive, from the service provider, obfuscated client intelligence data with the key in a data structure in another location allocated to the web browser, the obfuscated client intelligence data comprising encoded information related to an internet activity of the client, wherein the data structure comprises the key, a key identifier to identify the key, the obfuscated client intelligence data in one or more fields, and a data identifier to identify the obfuscated client intelligence data; and manage communications with the service provider, wherein the obfuscated client intelligence data is periodically updated, by the service provider, in response to the internet activity of the client, wherein the members of the authorized network, using the key, access the updated obfuscated client intelligence data.

7. The client device of claim 6, wherein the obfuscated client intelligence data is encoded; and the at least one processor is configured to periodically transmit the obfuscated client intelligence data to the service provider.

8. The client device of claim 7 wherein the obfuscated client intelligence data comprises a purchase history of the client.

9. The client device of claim 7 wherein the obfuscated client intelligence data comprises a browsing history of the client.

10. The client device of claim 7 wherein the web request comprises at least one of a client identifier and the key.

11. The client device of claim 7, wherein the obfuscated client intelligence data is periodically updated by the service provider to capture client internet activity at the website of the service provider and at third-party websites.

12. The client device of claim 11, wherein the periodic transmitting of the obfuscated client intelligence data to the service provider for updating occurs in response to a request by a third-party member of the authorized network for the obfuscated client intelligence data.

13. A system for securing client data generated as part of a client-server relationship, comprising:

a client device associated with a client, comprising:

a processor;

a non-transitory client storage device configured comprising browser program code, which when executed upon by the processor, is configured to:

forward a web request to a website of a service provider, the web request including a client identifier of a client;

receive, in response to the web request, a key from the service provider, and store the unique key, in a cookie of a web browser, configured to uniquely identify the client and known to members of an authorized network and used by the members of the authorized network to identify the client;

receive, from the service provider, obfuscated client intelligence data comprising encoded information related to an internet activity of the client, the obfuscated client intelligence data stored in with the unique key in a data structure of the web browser, wherein the data structure comprises the unique key, a key identifier to identify the unique key, the obfuscated client intelligence data in one or more fields, and a data identifier to identify the obfuscated client intelligence data;

manage communications with the service provider, wherein the obfuscated client intelligence data is periodically updated, by the service provider, in response to the internet activity of the client, wherein the members of the authorized network, using the key, access the updated obfuscated client intelligence data; and the service provider comprising:

a key manager for generating the unique key for the client;

a non-transitory server data store device configured to store the unique key and a copy of the obfuscated client intelligence data; and an interface, configured to forward to the obfuscated client intelligence data to a third party in response to a third-party request, the third-party request including the unique key associated with the client.

14. The system of claim 13, wherein the obfuscated client intelligence data includes client information related to at least one of a purchase history and an internet browsing history of the client.

15. The system of claim 14 wherein the interface of the service provider is further configured to forward the unique key associated with the client to the third party if the third party is a member of the authorized network permitted to access obfuscated client intelligence data.

16. The system of claim 15 wherein the key manager further comprises:

a transform unit for transforming at least a portion of the client information obtained from the service provider and coupled third-parties to produce the obfuscated client intelligence data; and wherein the interface is further configured to forward the obfuscated client intelligence data to the client and to the authorized network.

17. The method of claim 1, wherein the periodically transmitting of the obfuscated client intelligence data to the service provider occurs in response to a request by a third-party member of the authorized network for the obfuscated client intelligence data.

* * * * *